US012571465B2

(12) United States Patent
Azuma

(10) Patent No.: US 12,571,465 B2
(45) Date of Patent: Mar. 10, 2026

(54) GEAR DEVICE, BEARING REMOVAL DEVICE, AND BEARING REMOVAL METHOD

(71) Applicant: Mitsubishi Electric Corporation, Tokyo (JP)

(72) Inventor: Yoshiki Azuma, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 110 days.

(21) Appl. No.: 18/551,689

(22) PCT Filed: Jun. 4, 2021

(86) PCT No.: PCT/JP2021/021438
§ 371 (c)(1),
(2) Date: Sep. 21, 2023

(87) PCT Pub. No.: WO2022/254716
PCT Pub. Date: Dec. 8, 2022

(65) Prior Publication Data
US 2024/0183438 A1 Jun. 6, 2024

(51) Int. Cl.
*F16H 57/021* (2012.01)
*F16H 57/00* (2012.01)
*F16H 57/02* (2012.01)

(52) U.S. Cl.
CPC ....... *F16H 57/021* (2013.01); *F16H 57/0025* (2013.01); *F16H 2057/0062* (2013.01); *F16H 2057/02043* (2013.01)

(58) Field of Classification Search
CPC ... B25B 27/062; B25B 27/023; F16H 57/021; F16H 2057/0062; F16H 57/0025; F16H 2057/02043; F16C 35/06
See application file for complete search history.

(56) References Cited

U.S. PATENT DOCUMENTS

| | | | |
|---|---|---|---|
| 3,242,754 A | 3/1966 | Reed | |
| 5,174,662 A | 12/1992 | Harvey | |
| 5,373,636 A * | 12/1994 | Martinie | B25B 27/062 |
| | | | 29/256 |

(Continued)

FOREIGN PATENT DOCUMENTS

| | | | | |
|---|---|---|---|---|
| CN | 203471285 U | * | 3/2014 | |
| CN | 109108895 A | * | 1/2019 | B25B 27/062 |

(Continued)

OTHER PUBLICATIONS

Machine Translation of CN 203471285 (Year: 2014).*

(Continued)

*Primary Examiner* — Jake Cook
(74) *Attorney, Agent, or Firm* — Buchanan Ingersoll & Rooney PC

(57) ABSTRACT
A gear device includes a gear attached to a shaft to rotate integrally with the shaft, a pair of bearings located across the gear in a direction in which the shaft extends and supporting the shaft in a rotatable manner, and a plurality of removable members attached to the gear. The plurality of removable members are attached to two surfaces of the gear intersecting with the shaft. Each removable member of the plurality of removable members faces a bearing of the pair of bearings located across the gear.

18 Claims, 9 Drawing Sheets

(56)                References Cited

U.S. PATENT DOCUMENTS

| | | | | |
|---|---|---|---|---|
| 5,529,403 | A | * | 6/1996 | Martinie ............... F16C 23/084 |
| | | | | 384/585 |
| 5,908,249 | A | * | 6/1999 | Nisley ................... F16C 19/386 |
| | | | | 277/411 |
| 9,404,559 | B2 | * | 8/2016 | Van Buchan ............. B66C 1/24 |
| 2004/0107865 | A1 | | 6/2004 | Höhl |

FOREIGN PATENT DOCUMENTS

| | | | |
|---|---|---|---|
| DE | 69116647 | T2 | 9/1996 |
| DE | 10117749 | A1 | 11/2002 |
| JP | S57-130048 | U | 8/1982 |
| JP | H06-74551 | U | 10/1994 |
| JP | 2016-211629 | A | 12/2016 |
| JP | 2019219051 | A | 12/2019 |

OTHER PUBLICATIONS

Machine Translation of CN 109108895 (Year: 2019).*
International Search Report (PCT/ISA/210) with English translation and Written Opinion (PCT/ISA/237) mailed on Jul. 6, 2021, by the Japanese Patent Office as the International Searching Authority for International Application No. PCT/JP2021/021438.
Schaeffler Technologies AG & Co. KG: Montage von Wälzlagern, Schweinfurt, 2013, 5 pages.
Office Action dated Sep. 4, 2025, issued in the corresponding German Patent Application No. 112021007767.8, 14 pages including 8 pages of English Translation.

* cited by examiner

FIG.2

GEAR DEVICE, BEARING REMOVAL DEVICE, AND BEARING REMOVAL METHOD

TECHNICAL FIELD

The present disclosure relates to a gear device, a bearing remover, and a bearing removal method.

BACKGROUND ART

A railway vehicle includes a gear device that transmits rotational force from a motor to an axle. An example of such a gear device is described in Patent Literature 1. The gear device described in Patent Literature 1 includes a pinion coupled to the output shaft of the motor and a gear wheel engaged with the pinion and coupled to the axle. The gear device further includes output shaft bearings that support the output shaft in a rotatable manner, axle bearings that support the axle in a rotatable manner, and a gear box that accommodates the pinion, the gear wheel, the output shaft bearings, and the axle bearings.

CITATION LIST

Patent Literature

Patent Literature 1: Unexamined Japanese Patent Application Publication No. 2019-219051

SUMMARY OF INVENTION

Technical Problem

The output shaft bearings receive the load resulting from the weight of a rotator supported by the output shaft bearings in a rotatable manner, or more specifically, the weight of the output shaft to which the pinion is attached. The output shaft bearings thus have a shorter life than the pinion. Similarly, the axle bearings receive a load resulting from the weight of a rotator supported by the axle bearings in a rotatable manner, or more specifically, the weight of the axle to which the gear wheel is attached. The axle bearings thus have a shorter life than the gear wheel. Thus, among the components in the gear device, the output shaft bearings and the axle bearings may be replaced. For example, in the gear device described in Patent Literature 1, output shaft bearings can be removed easily by removing a lid, to which the output shaft bearings are fitted, together with the output shaft bearings from the gear device, but removal of the axle bearings is complicated.

More specifically, to remove the axle bearings that support the axle, a bearing box holding the axle bearings is removed from the gear box. To remove the axle bearings, the axle is then to be removed first from the gear device. When the gear wheel is tightly fitted to the axle, removal of the axle from the gear device is complicated, and thus removal of the axle bearings from the gear device is complicated. In addition to a gear device installed in a railway vehicle, such inconvenience may occur in various gear devices including bearings that support a shaft to which a gear is attached in a rotatable manner.

An objective of the present disclosure is to provide a gear device, a bearing remover, and a bearing removal method allowing easy removal of a bearing.

Solution to Problem

To achieve the above objective, a gear device according to an aspect of the present disclosure includes a gear, a pair of bearings, and a plurality of removable members. The gear is attached to a shaft to rotate integrally with the shaft. The pair of bearings are located across the gear in a direction in which the shaft extends. The pair of bearings support the shaft in a rotatable manner. The plurality of removable members are attached to two surfaces of the gear intersecting with the shaft. Each removable member of the plurality of removable members faces a bearing of the pair of bearings located across the gear.

Advantageous Effects of Invention

The gear device according to the above aspect of the present disclosure includes the plurality of removable members attached to the gear. Each removable member of the removable members faces either bearing of the pair of bearings located across the gear. Thus, moving the removable members in contact with the bearings along the shaft allows easy removal of the bearings from the shaft.

BRIEF DESCRIPTION OF DRAWINGS

FIG. 2 is a cross-sectional view of the gear device according to the embodiment taken along line II-II as viewed in the direction indicated by the arrows in FIG. 1;

DESCRIPTION OF EMBODIMENTS

A gear device, a bearing remover, and a bearing removal method according to an embodiment of the present disclosure are described in detail below with reference to the drawings. In the figures, the same reference signs denote the same or equivalent components.

Figure 1:
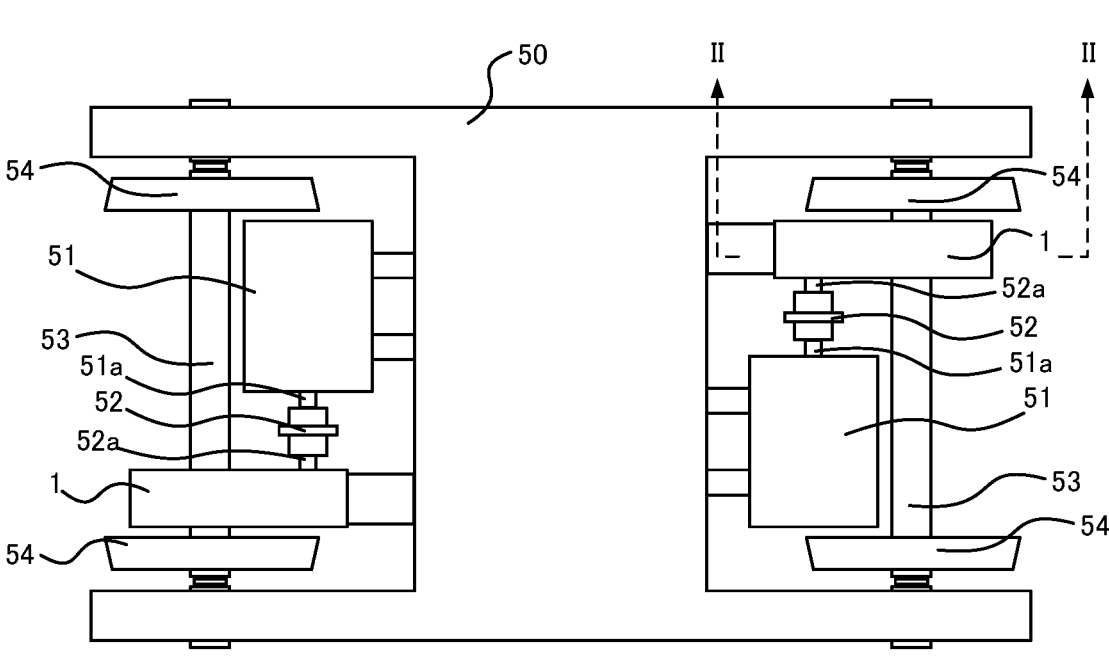
FIG. 1 is a top view of a truck to which gear devices according to an embodiment are attached.
Figure 1:
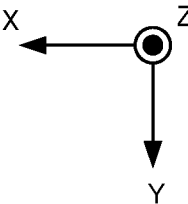

Gear devices 1 according to the embodiment are described using gear devices installed on a railway vehicle as examples. As illustrated in FIG. 1, the gear devices 1 are attached to a truck 50 in a railway vehicle. Motors 51 that transmit rotational force to the gear devices 1 through couplings 52 are attached to the truck 50. Axles 53 are attached to the truck 50 with axle springs, which are not illustrated, in between. Wheels 54 are attached to two ends of each axle 53.

In FIG. 1, Z-axis indicates the vertical direction, X-axis indicates the travel direction of the railway vehicle, and Y-axis indicates the width direction of the railway vehicle, or the direction in which each axle 53 extends. X-axis, Y-axis, and Z-axis are perpendicular to one another. The same applies to the other drawings.

Each motor 51 is a power source driven by power fed from a power source, which is not illustrated, to generate rotational force. When each motor 51 is driven, a shaft 51*a* rotates.

Each coupling 52 transmits rotational force transmitted from the corresponding shaft 51*a* to the gear device 1 through a drive shaft 52*a*. In other words, each drive shaft 52*a* is driven to rotate by the corresponding motor 51 serving as a power source.

Each axle 53 rotates integrally with the corresponding wheels 54 when receiving rotational force from the corresponding gear device 1.

Figure 2:
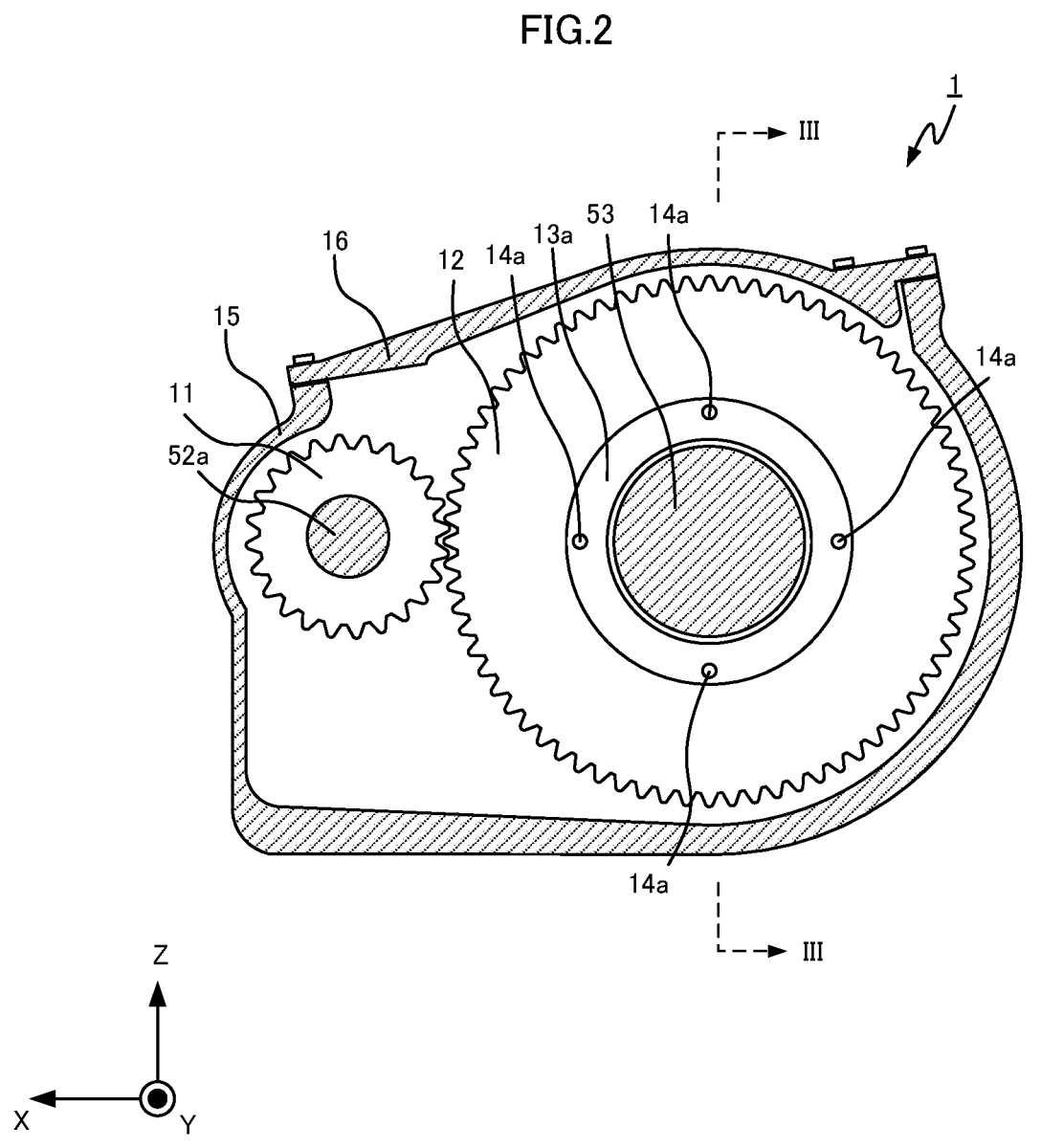

Each gear device 1 includes at least one gear and a pair of bearings that support, in a rotatable manner, a shaft to which the gear is attached. As illustrated in FIG. 2 that is a cross-sectional view taken along line II-II as viewed in the direction indicated by the arrows in FIG. 1, and FIG. 3 that is a cross-sectional view taken along line III-III as viewed in the direction indicated by the arrows in FIG. 2, each gear device 1 includes two gears 11 and 12, a pair of bearings that support, in a rotatable manner, a shaft to which the gear 11 is attached, and a pair of bearings that support, in a rotatable manner, a shaft to which the gear 12 is attached. In the example described below, the gear 11 attached to the drive shaft 52*a* is referred to as a drive gear 11, and the gear 12 meshing with the drive gear 11 and attached to the axle 53 serving as a follower shaft is referred to as a follower gear 12 for distinguishment. A pair of bearings that support the axle 53 in a rotatable manner are referred to as follower-shaft bearings 17*a* and 17*b*, and a pair of bearings that support the drive shaft 52*a* are referred to as drive-shaft bearings. The drive-shaft bearings are not illustrated.

The gear device 1 further includes a pair of rings 13*a* and 13*b* as multiple removable members. The rings 13*a* and 13*b* are attached to the follower gear 12 with fasteners 14*a* and 14*b*. The removable members are used to remove the follower-shaft bearings 17*a* and 17*b* from the corresponding axle 53. The removable members are firmly attached to the follower gear 12 not to be separate from the follower gear 12 during the rotation of the follower gear 12, and are removable from the follower gear 12 with, for example, a tool without being broken.

Each gear device 1 further includes the pair of follower-shaft bearings 17*a* and 17*b* that support the axle 53 in a rotatable manner and bearing holders 18*a* and 18*b* that respectively hold the follower-shaft bearings 17*a* and 17*b*. The follower-shaft bearing 17*a* is a rolling bearing including an inner race 21*a*, an outer race 22*a*, and rolling elements 23*a*. The follower-shaft bearing 17*b* is a rolling bearing including an inner race 21*b*, an outer race 22*b*, and rolling elements 23*b*. The gear device 1 further includes a gear box 15 and a lid 16. The gear box 15 accommodates the drive gear 11, the follower gear 12, the pair of follower-shaft bearings 17*a* and 17*b*, and the pair of rings 13*a* and 13*b*. The lid 16 closes an opening in the gear box 15 at the top in the vertical direction. The gear device 1 further includes oil throwers 19*a* and 19*b* and an earth ring 20. The oil throwers 19*a* and 19*b* suppress leakage of oil from the gear box 15. The earth ring 20 passes a current from the body of the railway vehicle to the rails through a ground brush, which is not illustrated.

In the gear device 1 with the above structure, when the ring 13*a* is removed from the follower gear 12 and then the ring 13*a* in contact with the follower-shaft bearing 17*a* is moved along the axle 53, the follower-shaft bearing 17*a* can be removed easily. Similarly, when the ring 13*b* in contact with the follower-shaft bearing 17*b* is moved along the axle

53, the follower-shaft bearing 17*b* can be removed easily. The components of the gear device 1 are described in detail below.

As illustrated in FIGS. 1 and 2, the drive gear 11 is attached to the drive shaft 52*a* and rotates integrally with the drive shaft 52*a*. More specifically, as the shaft 51*a* of the motor 51 rotates, the drive gear 11 rotates integrally with the drive shaft 52*a*. The drive gear 11 meshes with the follower gear 12 and transmits rotational force transmitted from the shaft 51*a* of the motor 51 through the coupling 52 to the follower gear 12.

As illustrated in FIG. 2, the follower gear 12 meshing with the drive gear 11 is attached to the axle 53. More specifically, the follower gear 12 is tightly fitted to the axle 53. The follower gear 12 rotates integrally with the axle 53 as the drive gear 11 rotates. In the embodiment, the follower gear 12 has a larger diameter and more teeth than the drive gear 11.

Figure 3:
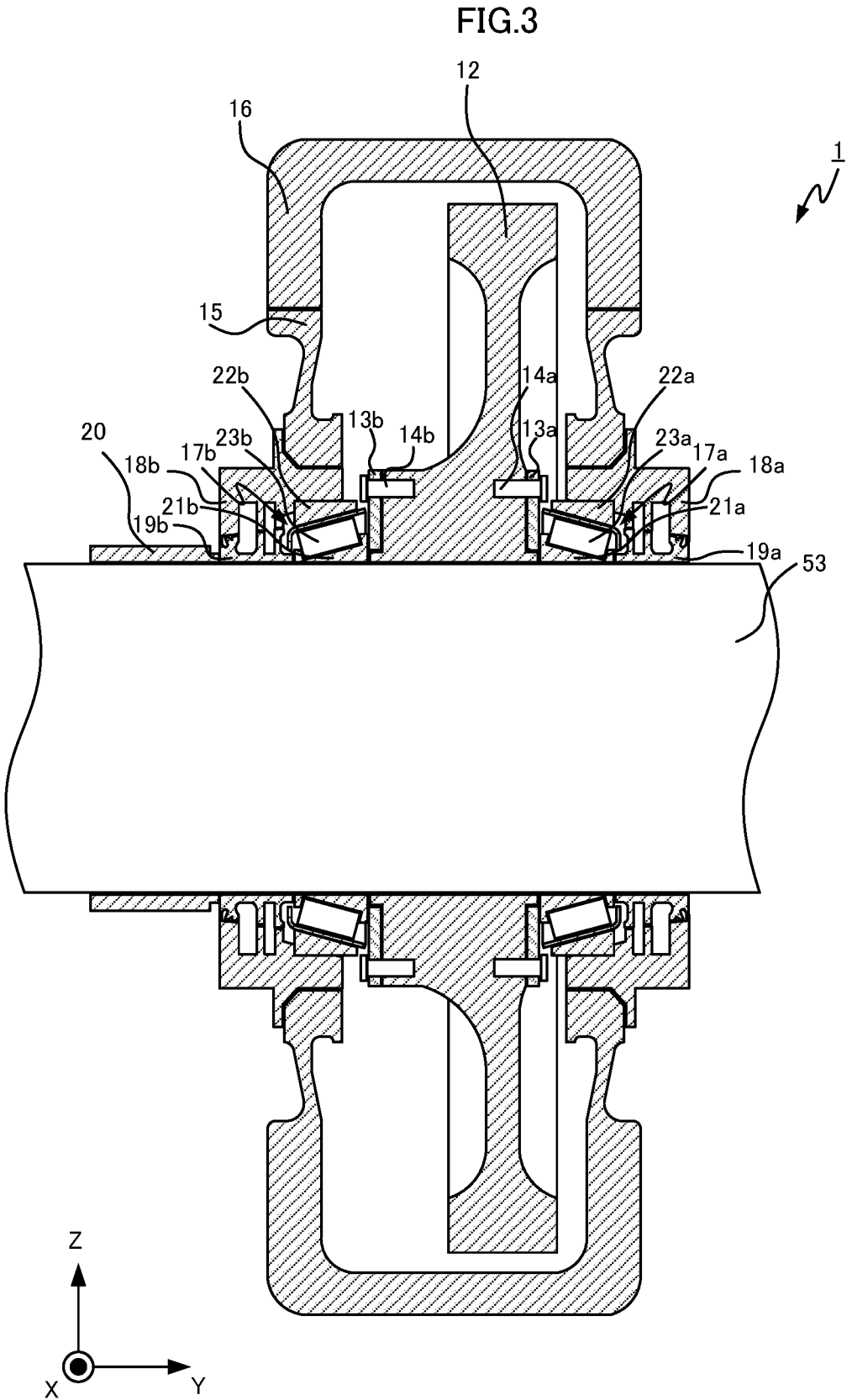
FIG. 3 is a cross-sectional view of the gear device according to the embodiment taken along line III-III as viewed in the direction indicated by the arrows in FIG. 2.
Figure 4:
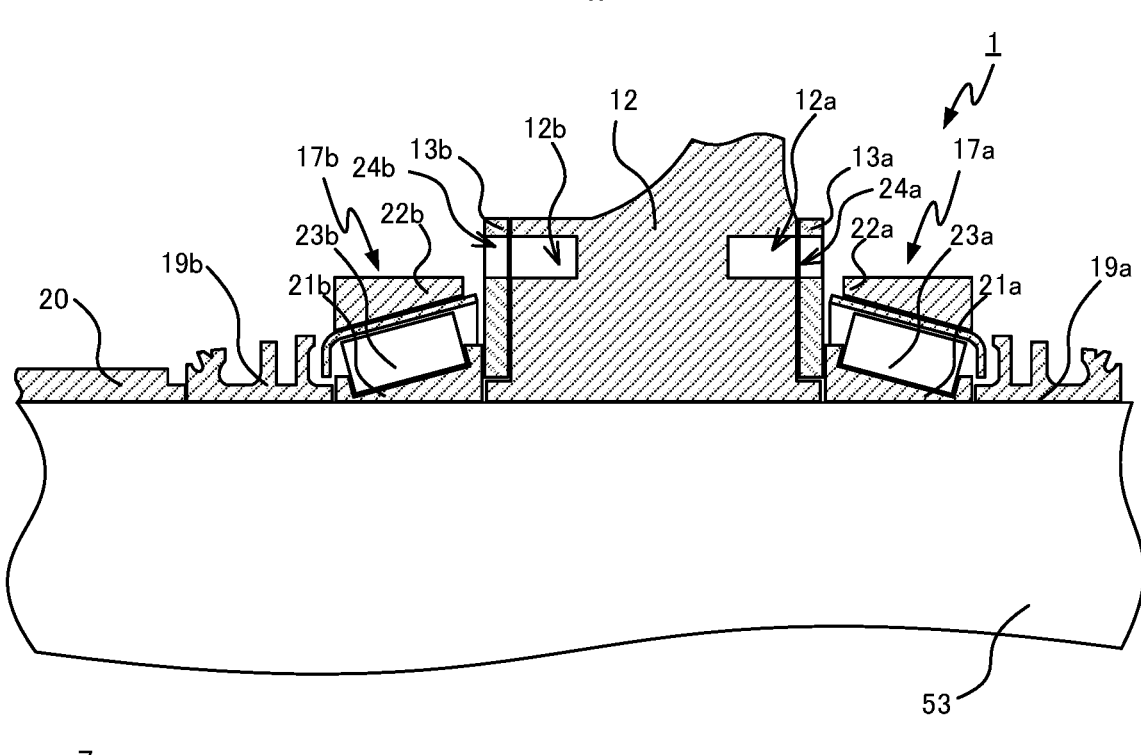
FIG. 4 is a partial cross-sectional view of the gear device according to the embodiment.
Figure 4:
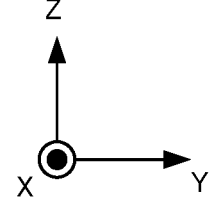

As illustrated in FIG. 4 that is a partially enlarged view of FIG. 3, the follower gear 12 has screw holes 12*a* for attaching the ring 13*a* in the surface facing in the positive Y-direction. The fasteners 14*a* and 14*b* are not illustrated in FIG. 4. The screw holes 12*a* are threaded to allow the fasteners 14*a* in FIG. 3 to be screwed in. In the embodiment, four screw holes 12*a* are arranged at regular intervals in the circumferential direction about Y-axis. As illustrated in FIG. 2, the ring 13*a* is attached to the follower gear 12 at four points.

The follower gear 12 has screw holes 12*b* for attaching the ring 13*b* in the surface facing in the negative Y-direction. The screw holes 12*b* are threaded to allow the fasteners 14*b* to be screwed in. In the embodiment, similarly to the screw holes 12*a*, four screw holes 12*b* are arranged at regular intervals in the circumferential direction about Y-axis. The ring 13*b* is attached to the follower gear 12 at four points.

The ring 13*a* is attached to the follower gear 12 and faces the follower-shaft bearing 17*a*. In the embodiment, the ring 13*a* has an outer diameter larger than the inner diameter of the outer race 22*a* in the follower-shaft bearing 17*a* at the surface of the outer race 22*a* facing the ring 13*a*. The ring 13*a* has an outer diameter that is preferably larger than the outer diameter of the outer race 22*a* in the follower-shaft bearing 17*a* at the surface of the outer race 22*a* facing the ring 13*a*. The ring 13*a* has an inner diameter smaller than the outer diameter of the inner race 21*a* in the follower-shaft bearing 17*a* at the surface of the inner race 21*a* facing the ring 13*a*. The ring 13*a* has an inner circumferential surface that is preferably spaced from the outer circumferential surface of the axle 53.

As illustrated in FIG. 4, the ring 13*a* has through-holes 24*a* for receiving the fasteners 14*a*. More specifically, the through-holes 24*a* are located to correspond to the screw holes 12*a*. When the fasteners 14*a* placed through the through-holes 24*a* are screwed into the screw holes 12*a*, the ring 13*a* is attached to the follower gear 12.

The ring 13*b* is attached to the follower gear 12 and faces the follower-shaft bearing 17*b*. In the embodiment, the ring 13*b* has an outer diameter larger than the inner diameter of the outer race 22*b* in the follower-shaft bearing 17*b* at the surface of the outer race 22*b* facing the ring 13*b*. The ring 13*b* has an outer diameter that is preferably larger than the outer diameter of the outer race 22*b* in the follower-shaft bearing 17*b* at the surface of the outer race 22*b* facing the ring 13*b*. The ring 13*b* has an inner diameter smaller than the outer diameter of the inner race 21*b* in the follower-shaft bearing 17*b* at the surface of the inner race 21*b* facing the ring 13*b*. The ring 13*b* has an inner circumferential surface that is preferably spaced from the outer circumferential surface of the axle 53.

The ring 13*b* has through-holes 24*b* for receiving the fasteners 14*b*. More specifically, the through-holes 24*b* are located to face the screw holes 12*b*. When the fasteners 14*b* extending through the through-holes 24*b* are attached to the follower gear 12, the ring 13*b* is attached to the follower gear 12.

The rings 13*a* and 13*b* are attached to the follower gear 12 and rotate integrally with the follower gear 12. Thus, the rings 13*a* and 13*b* are formed from a material having rigidity to the extent that the rings 13*a* and 13*b* are not broken by the rotation. For example, the rings 13*a* and 13*b* are annular members formed from a steel material, such as chrome molybdenum steel, with a thickness of 10 mm.

The fasteners 14*a* illustrated in FIG. 3 are threaded to be screwable into the screw holes 12*a* in the follower gear 12 through the through-holes 24*a* in the ring 13*a*.

The fasteners 14*b* are threaded to be screwable into the screw holes 12*b* in the follower gear 12 through the through-holes 24*b* in the ring 13*b*.

Figure 5:
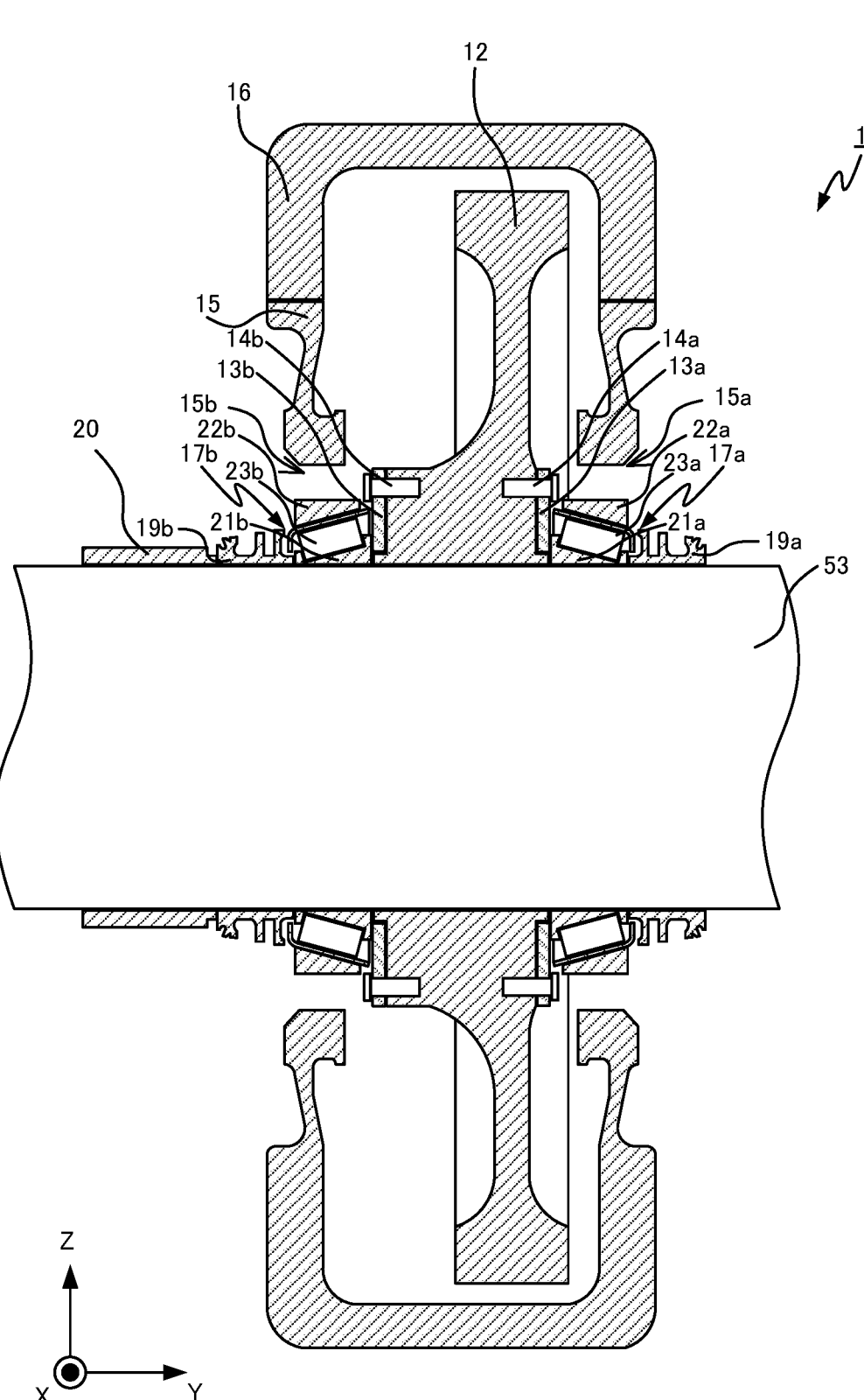
FIG. 5 is a cross-sectional view of the gear device according to the embodiment.

The gear box 15 illustrated in FIGS. 2 and 3 accommodates the drive gear 11, the follower gear 12, the rings 13*a* and 13*b* attached to the follower gear 12, the follower-shaft bearings 17*a* and 17*b*, and a pair of drive-shaft bearings, which is not illustrated, that supports the drive shaft 52*a* in a rotatable manner. As illustrated in FIG. 5 that corresponds to FIG. 3 without illustrating the bearing holders 18*a* and 18*b*, the gear box 15 has openings 15*a* and 15*b* in two surfaces intersecting with Y-axis. More specifically, the gear box 15 has the openings 15*a* and 15*b* in portions facing the rings 13*a* and 13*b*. To place the axle 53 through the follower gear 12 accommodated in the gear box 15, the openings 15*a* and 15*b* are shaped and sized to receive the axle 53. The opening 15*a* is shaped and sized to receive the follower-shaft bearing 17*a* and the ring 13*a*. The opening 15*b* is shaped and sized to receive the follower-shaft bearing 17*b* and the ring 13*b*.

As illustrated in FIG. 3, the opening 15*a* is closed with the bearing holder 18*a* and the oil thrower 19*a*, and the opening 15*b* is closed with the bearing holder 18*b* and the oil thrower 19*b*. The opening in the gear box 15 at the top in the vertical direction is closed with the lid 16. The gear box 15 has no opening at the bottom in the vertical direction. The drive gear 11 and the follower gear 12 are placed in and out of the gear box 15 through the opening at the top in the vertical direction.

The follower-shaft bearings 17*a* and 17*b* support the axle 53 in a rotatable manner. More specifically, the inner race 21*a* in the follower-shaft bearing 17*a* is attached to the axle 53 and rotates integrally with the axle 53. More specifically, the inner race 21*a* is fixed to the axle 53 immovably in Y-direction during the rotation of the axle 53. For example, the inner race 21*a* is press-fitted to the axle 53. The outer race 22*a* is held on the bearing holder 18*a*. More specifically, the outer race 22*a* is fixed to the bearing holder 18*a*. For example, the outer race 22*a* is press-fitted to the bearing holder 18*a*. The rolling elements 23*a* are located between the inner race 21*a* and the outer race 22*a* to roll as the inner race 21*a* rotates integrally with the axle 53. When the bearing holder 18*a* is removed from the gear box 15, the follower-shaft bearing 17*a* is slidable in Y-direction. More specifically, when pushed in the positive Y-direction by the ring 13*a*, the follower-shaft bearing 17*a* moves in the positive Y-direction, and is thus removable from the axle 53 without being broken.

The inner race 21*b* in the follower-shaft bearing 17*b* is attached to the axle 53 and rotates integrally with the axle 53. More specifically, the inner race 21*b* is firmly fixed to the axle 53 immovably in Y-direction during the rotation of the axle 53. For example, the inner race 21*b* is press-fitted to the axle 53. The outer race 22*b* is held on the bearing holder 18*b*. More specifically, the outer race 22*b* is fixed to the bearing holder 18*b*. For example, the outer race 22*b* is press-fitted to the bearing holder 18*b*. The rolling elements 23*b* are located between the inner race 21*b* and the outer race 22*b* to roll as the inner race 21*b* rotates integrally with the axle 53. When the bearing holder 18*b* is removed from the gear box 15, the follower-shaft bearing 17*b* is slidable in Y-direction. More specifically, when pressed by the ring 13*b* in the negative Y-direction, the follower-shaft bearing 17*b* moves in the negative Y-direction, and is removable from the axle 53 without being broken.

The bearing holder 18*a* illustrated in FIG. 3 is attached to the surface of the gear box 15 facing in the positive Y-direction. The bearing holder 18 holds the follower-shaft bearing 17*a* and closes the opening 15*a* in the gear box 15 illustrated in FIG. 5. The bearing holder 18*b* illustrated in FIG. 3 is attached to the surface of the gear box 15 facing in the negative Y-direction. The bearing holder 18*b* holds the follower-shaft bearing 17*b* and closes the opening 15*b* in the gear box 15 illustrated in FIG. 5.

The oil throwers 19*a* and 19*b* are attached to the axle 53 at positions to hold the follower-shaft bearings 17*a* and 17*b* in between. More specifically, the oil throwers 19*a* and 19*b* are fixed to the axle 53. For example, the oil throwers 19*a* and 19*b* are press-fitted to the axle 53. The oil throwers 19*a* and 19*b* have recesses and protrusions on the outer circumferential surfaces. The recesses and protrusions on the outer circumferential surface of the oil thrower 19*a* define a labyrinth flow path between the oil thrower 19*a* and the bearing holder 18*a*. The recesses and protrusions on the outer circumferential surface of the oil thrower 19*b* define a labyrinth flow path between the oil thrower 19*b* and the bearing holder 18*b*. These labyrinth flow paths prevent leakage of a lubricant, which is not illustrated, contained in the gear box 15 from the gear box 15.

The earth ring 20 is formed from a conductive material, and passes a current from the body of the railway vehicle through a ground brush, which is not illustrated, to the rails. The earth ring 20 is firmly fixed to the axle 53 immovably in Y-direction during the rotation of the axle 53. For example, the earth ring 20 is press-fitted to the axle 53.

A method for removing the follower-shaft bearings 17*a* and 17*b* from the gear device 1 with the above structure is described below. The gear devices 1 are removed from the truck 50 illustrated in FIG. 1, the wheels 54 are removed from the axles 53, and, as illustrated in FIG. 5, the bearing holders 18*a* and 18*b* are removed from the gear device 1 illustrated in FIG. 3. Thereafter, the follower-shaft bearings 17*a* and 17*b* are removed using bearing removers 30 illustrated in FIG. 6.

More specifically, each bearing remover 30 includes removal tools 31 attachable to the ring 13*a* or 13*b*, a driver 32 that urges the ring 13*a* or 13*b* away from the follower gear 12 by extending a rod 32*a*, a plate 33 in contact with the rod 32*a*, and fasteners 34 that fix the removal tools 31 to the plate 33.

In the embodiment, each bearing remover 30 includes four rod-like removal tools 31. Each removal tool 31 has two threaded ends. The through-holes 24*a* in the ring 13*a* and the through-holes 24*b* in the ring 13*b* are threaded portions, or more specifically, threaded holes into which one threaded end of the removal tool 31 is screwable. In other words, the through-holes 24*a* in the ring 13*a* and the through-holes 24*b* in the ring 13*b* are examples of device receivers to which the bearing remover 30 is attachable.

The other end of each removal tool 31 extends through the corresponding plate 33 and is fixed to the plate 33 by being fastened with the corresponding fastener 34. Each removal tool 31 is formed from a material, such as iron or a steel material, that has rigidity to the extent that each removal tool 31 is not deformed with a force applied when the rings 13*a* and 13*b* are removed.

The driver 32 is a hydraulic cylinder having, for example, one end in contact with the axle 53 and the other end receiving the rod 32*a*. The driver 32 extends the rod 32*a* away from the axle 53.

The plate 33 is placed in contact with the rod 32*a* when the rod 32*a* is at an initial position, or the rod 32*a* is not extended. For example, the plate 33 is attached to the rod 32*a* when the rod 32*a* at the initial position is fitted to a fit-in hole in the plate 33. As described above, with the plate 33 attached to the rod 32*a*, the removal tools 31 are fixed to the plate 33. The plate 33 is formed from a material, such as iron or a steel material, that has rigidity to the extent that the plate 33 is not deformed when being pressed by the rod 32*a*.

Figure 6:
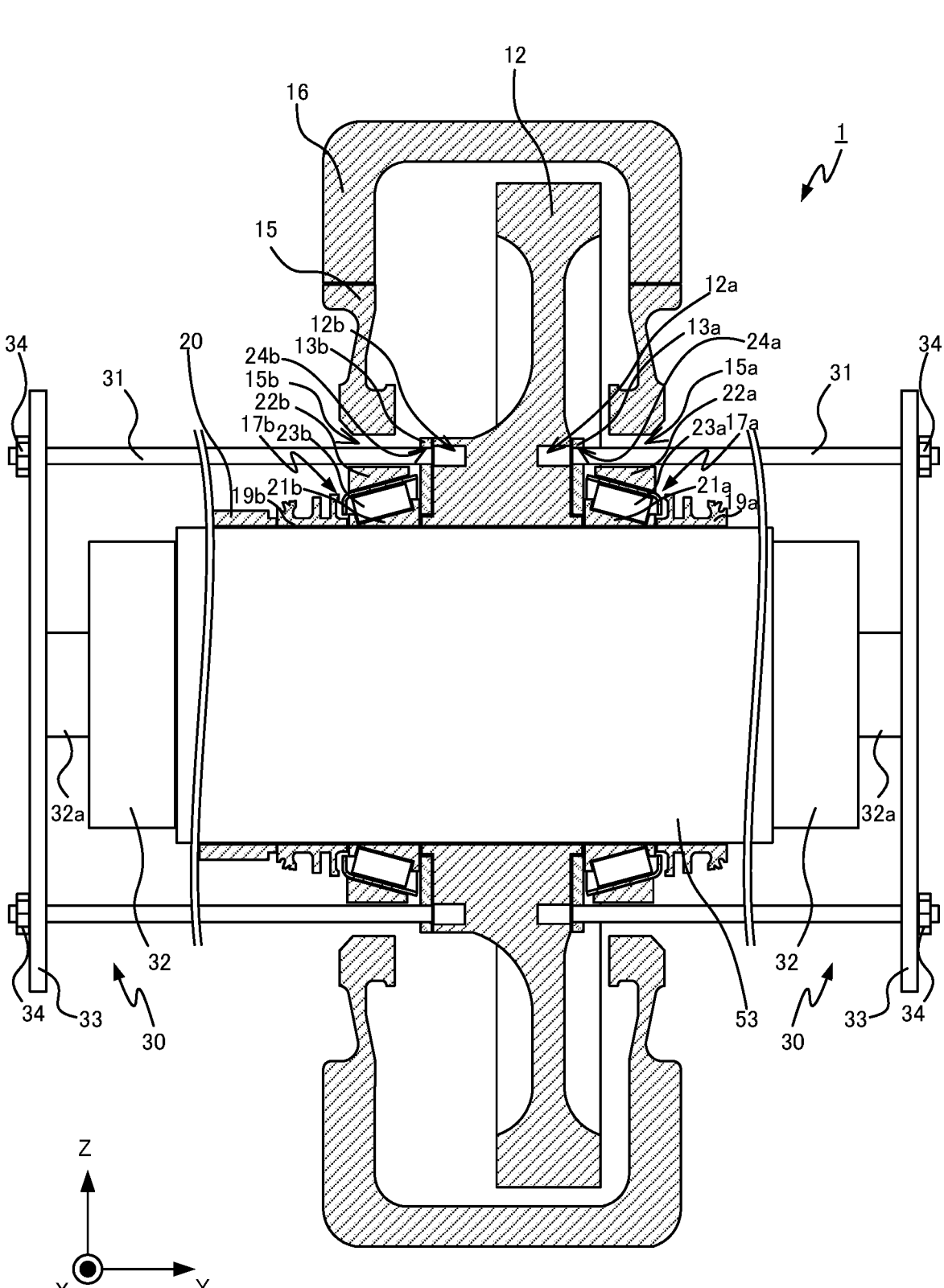
FIG. 6 is a diagram describing a method for removing bearings in the gear device according to the embodiment.

A method for removing the follower-shaft bearing 17*a* from the gear device 1 is described below. As illustrated in FIG. 6, the four removal tools 31 in the bearing remover 30 located in the positive Y-direction from the gear device 1 each have one end inserted and screwed into the corresponding through-hole 24*a* in the ring 13*a*. Thus, the four removal tools 31 are attached to the ring 13*a*. The removal tools 31 are not inserted into the screw holes 12*a* in the follower gear 12. To prevent the removal tools 31 from being inserted into the screw holes 12*a*, the through-holes 24*a* in the ring 13*a* are preferably larger than the screw holes 12*a* in the follower gear 12. In this case, the fasteners 14*a* may be shaped to have radially stepwise sizes.

The other end of each of the four removal tools 31 extends through the plate 33 and is fastened with the corresponding fastener 34. Thus, the four removal tools 31 are attached to the plate 33.

The driver 32 extends the rod 32*a* away from the axle 53, or in the positive Y-direction. Thus, the plate 33 moves in the positive Y-direction, and the four removal tools 31 move in the positive Y-direction with the plate 33 moving. Thus, the ring 13*a* to which the four removal tools 31 are attached is urged away from the follower gear 12, or in the positive Y-direction, and moves in the positive Y-direction. In other words, the driver 32 operates as a driver that urges the ring 13*a* away from the follower gear 12.

Figure 7:
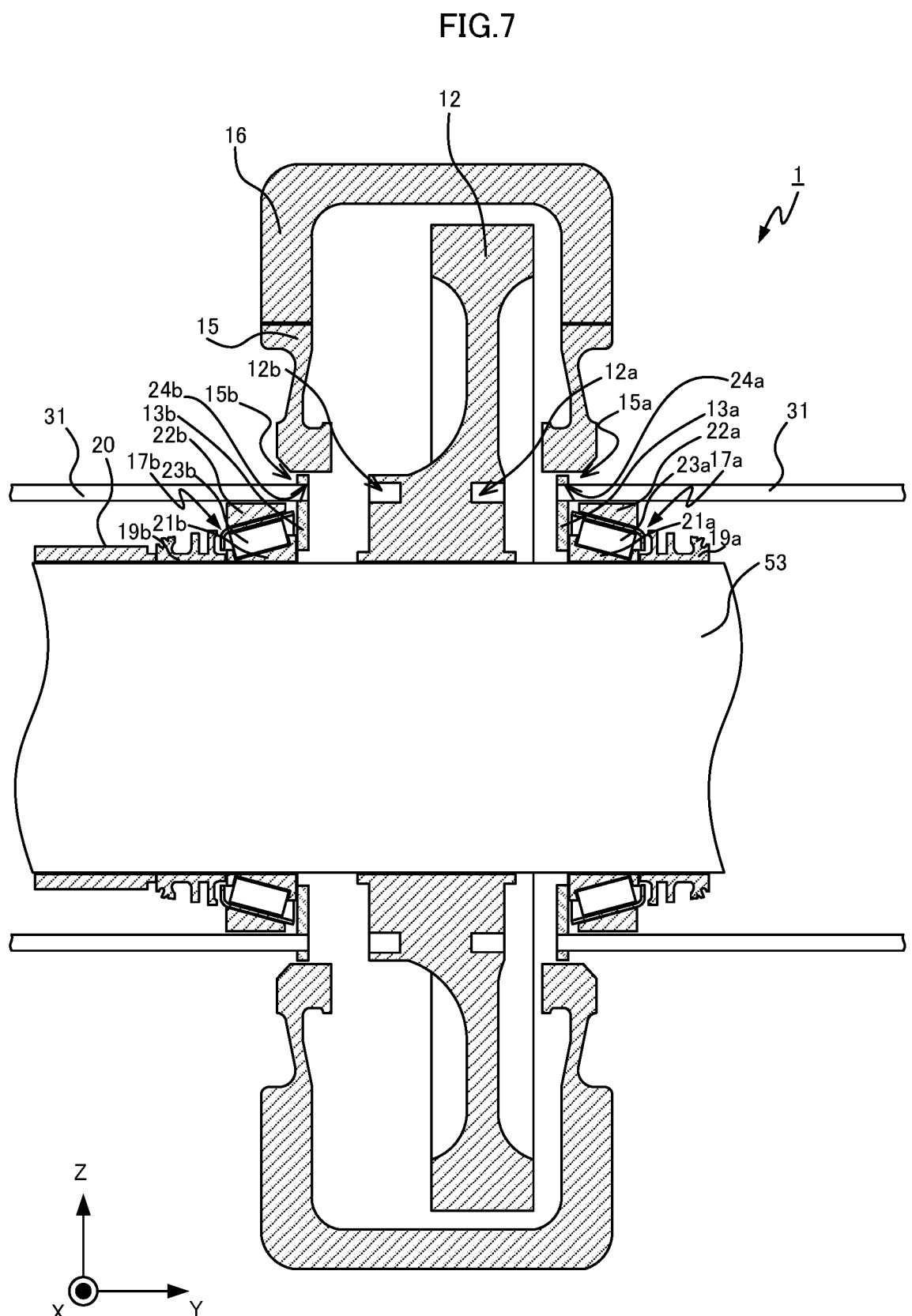
FIG. 7 is a diagram describing a method for removing bearings in the gear device according to the embodiment.

As described above, the ring 13*a* has an outer diameter larger than the inner diameter of the outer race 22*a* in the follower-shaft bearing 17*a* at the surface of the outer race 22*a* facing the ring 13*a*, and the ring 13*a* has an inner diameter smaller than the outer diameter of the inner race 21*a* in the follower-shaft bearing 17*a* at the surface of the inner race 21*a* facing the ring 13*a*. Thus, when the ring 13*a* moves in the positive Y-direction, the ring 13*a* comes in contact with the follower-shaft bearing 17*a*. When the ring 13*a* is further urged by the driver 32 away from the follower gear 12, as illustrated in FIG. 7, the ring 13*a* in contact with the follower-shaft bearing 17*a* moves in the positive Y-direction along the axle 53. As described above, when the ring 13*a* moves in the positive Y-direction, the follower-shaft bearing 17*a* and the oil thrower 19*a* move in the positive Y-direction. When the plate 33 is removed after the oil thrower 19*a* arrives at the end of the axle 53, the follower-shaft bearing 17*a* and the oil thrower 19*a* can be removed from the axle 53.

The follower-shaft bearing 17*b* is removed in the same manner as well. More specifically, as illustrated in FIG. 6, the four removal tools 31 in the bearing remover 30 located in the negative Y-direction from the gear device 1 each have one end inserted and screwed into the corresponding through-hole 24*b* in the ring 13*b*. Thus, the four removal tools 31 are attached to the ring 13*b*. The removal tools 31 are not inserted into the screw holes 12*b* in the follower gear 12. To prevent the removal tools 31 from being inserted into the screw holes 12*b*, the through-holes 24*b* in the ring 13*b* are preferably larger than the screw holes 12*b* in the follower gear 12. In this case, the fasteners 14*b* may be shaped to have radially stepwise sizes.

The other end of each of the four removal tools 31 extends through the plate 33 and is fastened with the corresponding fastener 34. Thus, the four removal tools 31 are attached to the plate 33.

The driver 32 extends the rod 32*a* away from the axle 53, or in the negative Y-direction. Thus, the plate 33 moves in the negative Y-direction, and the four removal tools 31 move in the negative Y-direction with the plate 33 moving. Thus, the ring 13*b* to which the four removal tools 31 are attached is urged away from the follower gear 12, or in the negative Y-direction, and moves in the negative Y-direction. In other words, the driver 32 operates as a driver that urges the ring 13*b* away from the follower gear 12.

As described above, the ring 13*b* has an outer diameter larger than the inner diameter of the outer race 22*b* in the follower-shaft bearing 17*b* at the surface of the outer race 22*b* facing the ring 13*b*, and the ring 13*b* has an inner diameter smaller than the outer diameter of the inner race 21*b* in the follower-shaft bearing 17*b* at the surface of the inner race 21*b* facing the ring 13*b*. Thus, when the ring 13*b* moves in the negative Y-direction, the ring 13*b* comes in contact with the follower-shaft bearing 17*b*. When the ring 13*b* is further urged by the driver 32 away from the follower gear 12, as illustrated in FIG. 7, the ring 13*b* in contact with the follower-shaft bearing 17*b* moves in the negative Y-direction along the axle 53. As described above, when the ring 13*b* moves in the negative Y-direction, the follower-shaft bearing 17*b*, the oil thrower 19*b*, and the earth ring 20 move in the negative Y-direction. When the plate 33 is removed after the earth ring 20 arrives at the end of the axle 53, the follower-shaft bearing 17*b*, the oil thrower 19*b*, and the earth ring 20 can be removed from the axle 53.

After the follower-shaft bearings 17*a* and 17*b* are removed, the rings 13*a* and 13*b* are attached to the follower gear 12 again, and new follower-shaft bearings 17*a* and 17*b* are attached to the axle 53. Thereafter, the oil throwers 19*a* and 19*b*, the earth ring 20, and the bearing holders 18*a* and 18*b* are attached. This completes the replacement of the follower-shaft bearings 17*a* and 17*b*.

As described above, in the gear device 1 including the rings 13*a* and 13*b*, the follower-shaft bearings 17*a* and 17*b* can be removed easily from the axle 53 using the bearing remover 30. As described above, the rings 13*a* and 13*b* in contact with the follower-shaft bearings 17*a* and 17*b* move along the axle 53, and thus the follower-shaft bearings 17*a* and 17*b* are removed from the axle 53. To remove the follower-shaft bearings 17*a* and 17*b* in the above manner, the follower gear 12 remains unremoved from the axle 53. Thus, the follower-shaft bearings 17*a* and 17*b* can be removed easily from the gear device 1.

The present disclosure is not limited to the above embodiment.

The rings 13*a* and 13*b* may be attached to the follower gear 12 in any manner, rather than being fastened with the fasteners 14*a* and 14*b*, when the rings 13*a* and 13*b* are firmly attached without being removed from the follower gear 12 during rotation. In one example, the rings 13*a* and 13*b* may be attached to the follower gear 12 by shrink fitting.

In examples other than the above example, the removal tools 31 may be attached to the rings 13*a* and 13*b* in any manner without being separated from the rings 13*a* and 13*b* with a force applied when the rings 13*a* and 13*b* are removed. In one example, the rings 13*a* and 13*b* may each have a threaded protrusion, and the removal tools 31 may each have a threaded screw hole at one end. The protrusion on the ring 13*a* or 13*b* may be screwed into the screw hole at one end of the corresponding removal tool 31 to attach the removal tool 31 to the ring 13*a* or 13*b*.

In another example, the rings 13*a* and 13*b* may have fit portions to which the bearing remover 30 can be fit, to serve as device receivers to which the bearing remover 30 is attachable. More specifically, the through-holes 24*a* in the ring 13*a* and the through-holes 24*b* in the ring 13*b* may be fit-in holes into which the removal tools 31 can be fitted. For example, an elastic member that deforms when pressed may be attached to one end of the removal tool 31. One of the removal tools 31 to which the elastic member is attached may be inserted into and fitted to the through-hole 24*a* or 24*b*.

Figure 8:
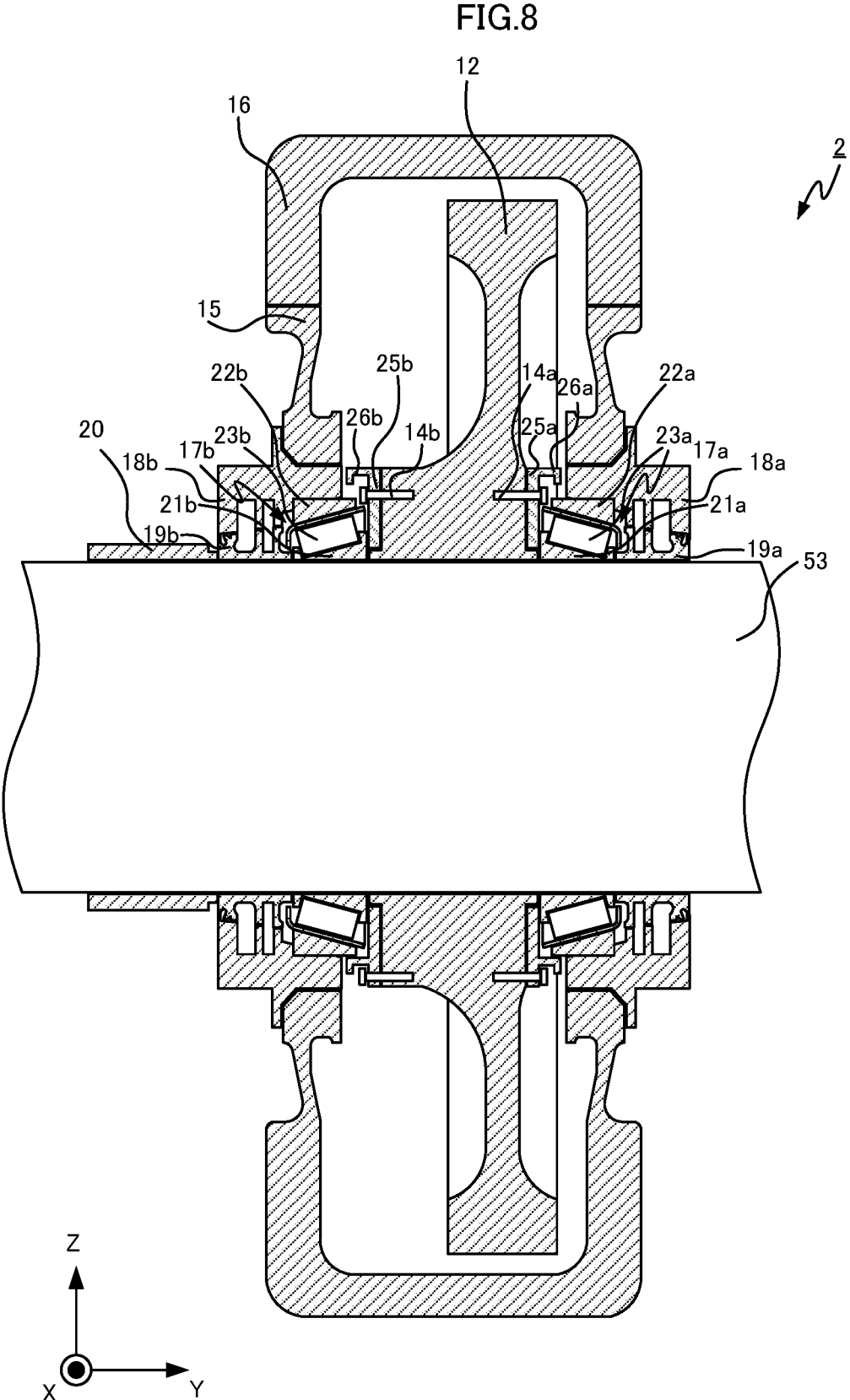
FIG. 8 is a cross-sectional view of a gear device according to a modification of the embodiment.
Figure 9:
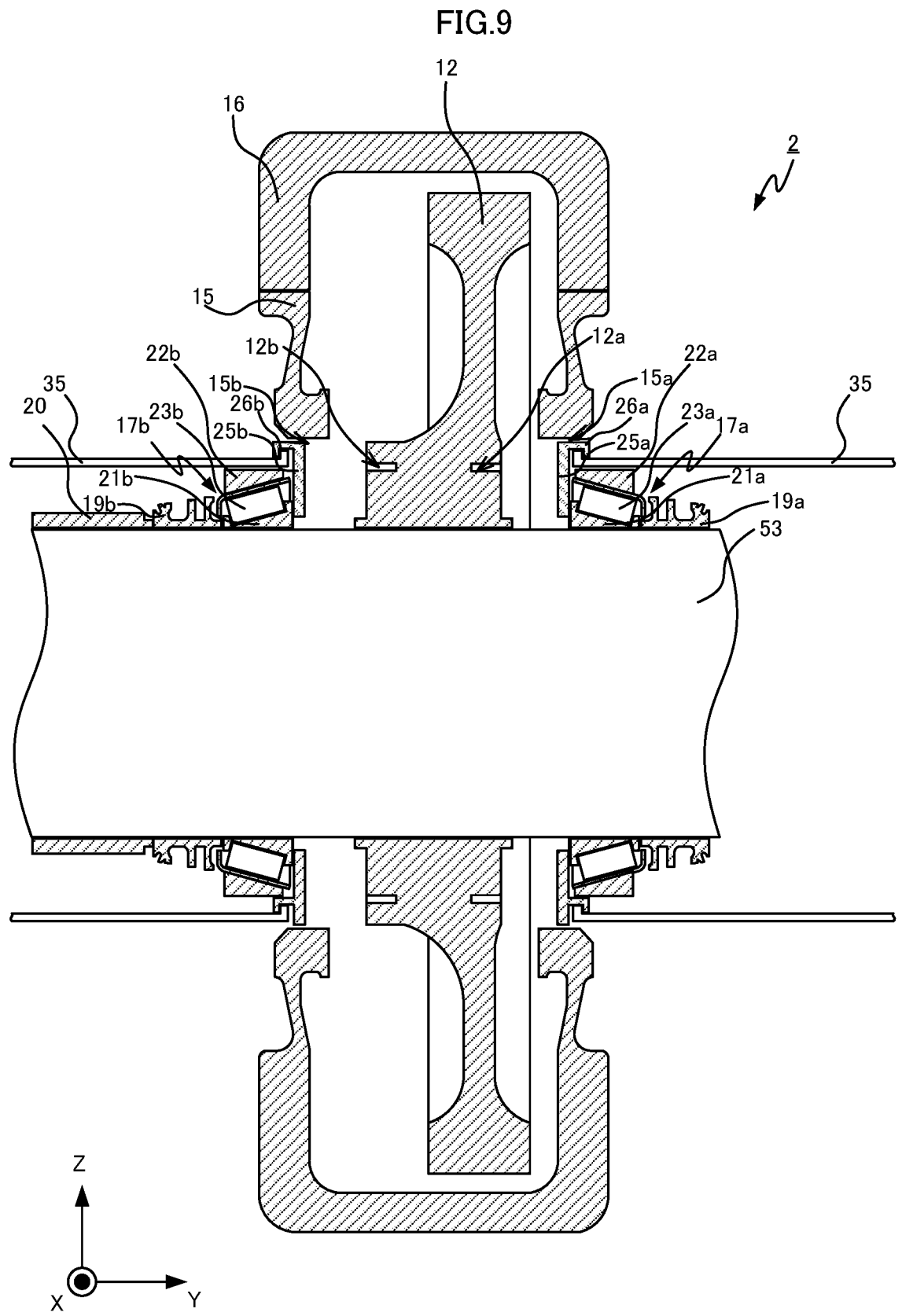
FIG. 9 is a diagram describing a method for removing bearings in the gear device according to the modification of the embodiment.

In another example, a gear device 2 illustrated in FIG. 8 includes hook-like locks 26*a* and 26*b* serving as device receivers to which the bearing remover 30 is attachable. The locks 26*a* and 26*b* have distal ends preferably protruding in the same direction. As illustrated in FIG. 9, the bearing remover 30 may include removal tools 35 each having one end bent to be hooked on the corresponding lock 26*a* or 26*b*.

The rings 13*a*, 13*b*, 25*a*, and 25*b* may not be annular but may have any other shapes. For example, the rings 13*a*, 13*b*, 25*a*, and 25*b* may have a partially-open annular shape, or a shape including multiple arcs spaced from one another. In another example, the rings 13*a*, 13*b*, 25*a*, and 25*b* may have a polygonal shape with a through-hole at the center, or a shape including multiple rectangles spaced from one another. In another example, the rings 13*a*, 13*b*, 25*a*, and 25*b* may not be a plate but may be a block.

The rings 13*a*, 13*b*, 25*a*, and 25*b* may be attached to the drive gear 11. For example, when the rings 13*a* and 13*b* are attached to the drive gear 11, a pair of drive-shaft bearings, which is not illustrated, that supports the drive shaft in a rotatable manner can be removed easily. The rings 13*a* and 13*b* may be attached to the drive gear 11 and the follower gear 12.

The follower-shaft bearings 17*a* and 17*b* may be sliding bearings, in place of the rolling bearings described in the above embodiment.

The oil throwers 19*a* and 19*b* may be attached to the axle 53 in a manner other than in the above example. The oil throwers 19*a* and 19*b* may be firmly attached to the axle 53 immovably in Y-direction during the rotation of the axle 53. For example, the oil throwers 19*a* and 19*b* may move in the circumferential direction without moving in Y-direction during the rotation of the axle 53. In other words, the oil throwers 19*a* and 19*b* may rotate relative to the axle 53.

The removal tools 31 may be other than rods. For example, the removal tools 31 may be wires including threaded metal members attached at two ends. In another example, the removal tools 31 may be cylindrical members. In this case, one end of the cylindrical member may be fitted to the ring 13*a* or 13*b*.

The gear device may have any number of removal tools 31 or 35, rather than the number in the above example.

The removal tools 31 or 35 may be fixed to the plate 33 in any manner other than the manner described in the above example. In one example, the removal tools 31 or 35 may be attached to the plate 33 by a method such as welding, bonding with an adhesive, or fitting.

The driver 32 may be any device, in place of a hydraulic cylinder, that can urge the rings 13*a*, 13*b*, 25*a*, and 25*b* away from the follower gear 12.

The bearing remover 30 may have any structure that can urge the rings 13*a*, 13*b*, 25*a*, and 25*b* away from the follower gear 12.

The gear device 1 or 2 may be installed in any movable body such as an automobile or a bus, or an industrial machine, in place of a railway vehicle.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1, 2 Gear device
11 Drive gear
12 Follower gear
12*a*, 12*b* Screw hole
13*a*, 13*b*, 25*a*, 25*b* Ring
14*a*, 14*b*, 34 Fastener
15 Gear box
15*a*, 15*b* Opening
16 Lid
17*a*, 17*b* Follower-shaft bearing
18*a*, 18*b* Bearing holder
19*a*, 19*b* Oil thrower
20 Earth ring
21*a*, 21*b* Inner race
22*a*, 22*b* Outer race
23*a*, 23*b* Rolling element
24*a*, 24*b* Through-hole
26*a*,26*b* Lock
30 Bearing remover
31,35 Removal tool
32 Driver
32*a* Rod
33 Plate
50 Truck
51 Motor
51*a* Shaft
52 Coupling
52*a* Drive shaft
53 Axle
54 Wheel

The invention claimed is:
1. A gear device, comprising:
a gear attached to a shaft to rotate integrally with the shaft;

a pair of bearings located across the gear in a direction in which the shaft extends, the pair of bearings supporting the shaft in a rotatable manner; and a plurality of removable members fixed to two surfaces of the gear intersecting with the shaft, each removable member of the plurality of removable members facing a different bearing of the pair of bearings located across the gear.

2. A gear device, comprising:

a gear attached to a shaft to rotate integrally with the shaft;

a pair of bearings located across the gear in a direction in which the shaft extends, the pair of bearings supporting the shaft in a rotatable manner; and a plurality of removable members attached to two surfaces of the gear intersecting with the shaft, each removable member of the plurality of removable members facing a bearing of the pair of bearings located across the gear, wherein the plurality of removable members are attached to the two surfaces of the gear intersecting with the shaft, and include two rings, at least a portion of each ring of the two rings facing the pair of bearings.

3. The gear device according to claim 2, wherein each bearing of the pair of bearings includes an inner race, an outer race, and a plurality of rolling elements held between the inner race and the outer race, each of the two rings has an outer diameter larger than an inner diameter of the outer race in each bearing of the pair of bearings at a surface of the outer race facing the ring, and each of the two rings has an inner diameter smaller than an outer diameter of the inner race in each bearing of the pair of bearings at a surface of the inner race facing the ring.

4. The gear device according to claim 1, wherein each removable member of the plurality of removable members includes a device receiver to which a bearing remover is attachable, and the plurality of removable members are urged away from the gear by the bearing remover attached to the device receiver to move away from the gear while at least a portion of each removable member of the plurality of removable members is in contact with the bearing facing the at least one removable member.

5. The gear device according to claim 2, wherein each removable member of the plurality of removable members includes a device receiver to which a bearing remover is attachable, and the plurality of removable members are urged away from the gear by the bearing remover attached to the device receiver to move away from the gear while at least a portion of each removable member of the plurality of removable members is in contact with the bearing facing the at least one removable member.

6. The gear device according to claim 3, wherein each removable member of the plurality of removable members includes a device receiver to which a bearing remover is attachable, and the plurality of removable members are urged away from the gear by the bearing remover attached to the device receiver to move away from the gear while at least a portion of each removable member of the plurality of removable members is in contact with the bearing facing the at least one removable member.

7. The gear device according to claim 4, wherein the device receiver includes a screw portion into which the bearing remover is screwable.

8. The gear device according to claim 5, wherein the device receiver includes a screw portion into which the bearing remover is screwable.

9. The gear device according to claim 6, wherein the device receiver includes a screw portion into which the bearing remover is screwable.

10. The gear device according to claim 4, wherein the device receiver includes a fit portion to which the bearing remover is fittable.

11. The gear device according to claim 5, wherein the device receiver includes a fit portion to which the bearing remover is fittable.

12. The gear device according to claim 6, wherein the device receiver includes a fit portion to which the bearing remover is fittable.

13. The gear device according to claim 4, wherein the device receiver includes a lock on which the bearing remover is to be locked.

14. The gear device according to claim 5, wherein the device receiver includes a lock on which the bearing remover is to be locked.

15. The gear device according to claim 6, wherein the device receiver includes a lock on which the bearing remover is to be locked.

16. The gear device according to claim 4, further comprising:

a gear box having an opening that is openable and closable, the gear box accommodating the gear, the pair of bearings, and the plurality of removable members, wherein the bearing remover is attachable to the device receiver in each removable member of the plurality of removable members through the opening.

17. A bearing remover, comprising:

a removal tool attachable to the device receiver in each removable member of the plurality of removable members included in the gear device according to claim 4; and a driver to urge the removal tool away from the gear.

18. A bearing removal method for removing a pair of bearings from a gear device, the gear device including a gear attached to a shaft to rotate integrally with the shaft, the pair of bearings located across the gear in a direction in which the shaft extends and supporting the shaft in a rotatable manner, and a plurality of removable members fixed to two surfaces of the gear intersecting with the shaft, each removable member of the plurality of removable members facing a different bearing of the pair of bearings, the method comprising:

urging the plurality of removable members away from the gear to move the plurality of removable members away from the gear while each removable member of the plurality of removable members is in contact with a bearing of the pair of bearings facing the removable member of the plurality of removable members.

* * * * *